United States Patent [19]
Campau

[11] 3,788,151
[45] Jan. 29, 1974

[54] SHOCK ABSORBING STARTER CLUTCH MECHANISM
[75] Inventor: Walter J. Campau, Grosse Pointe Woods, Mich.
[73] Assignee: Chrysler Corporation, Highland Park, Mich.
[22] Filed: Oct. 6, 1972
[21] Appl. No.: 295,752

[52] U.S. Cl. .......................... 74/7 A, 64/14, 74/7 R
[51] Int. Cl. ........................................... F02n 11/00
[58] Field of Search.. 74/6, 7 R, 7 A; 192/42; 64/14

[56] References Cited
UNITED STATES PATENTS
3,177,728  4/1965  Farison ................................ 74/7 A
3,327,821  6/1967  Digby ................................ 192/42 X
3,616,700  11/1971  Patchett .............................. 74/7 R Primary Examiner—Allan D. Herrmann

[57] ABSTRACT

In a geared starter unit used in motor vehicles resilient shock absorbing members are interposed in the space between the driver and the driven members of the starter clutch unit for transmitting torque from the starter motor through the overrunning clutch to the ring gear and for absorbing the high impact loads developed by engine backfiring from being applied from the ring gear back through the clutch to the driver member.

7 Claims, 5 Drawing Figures

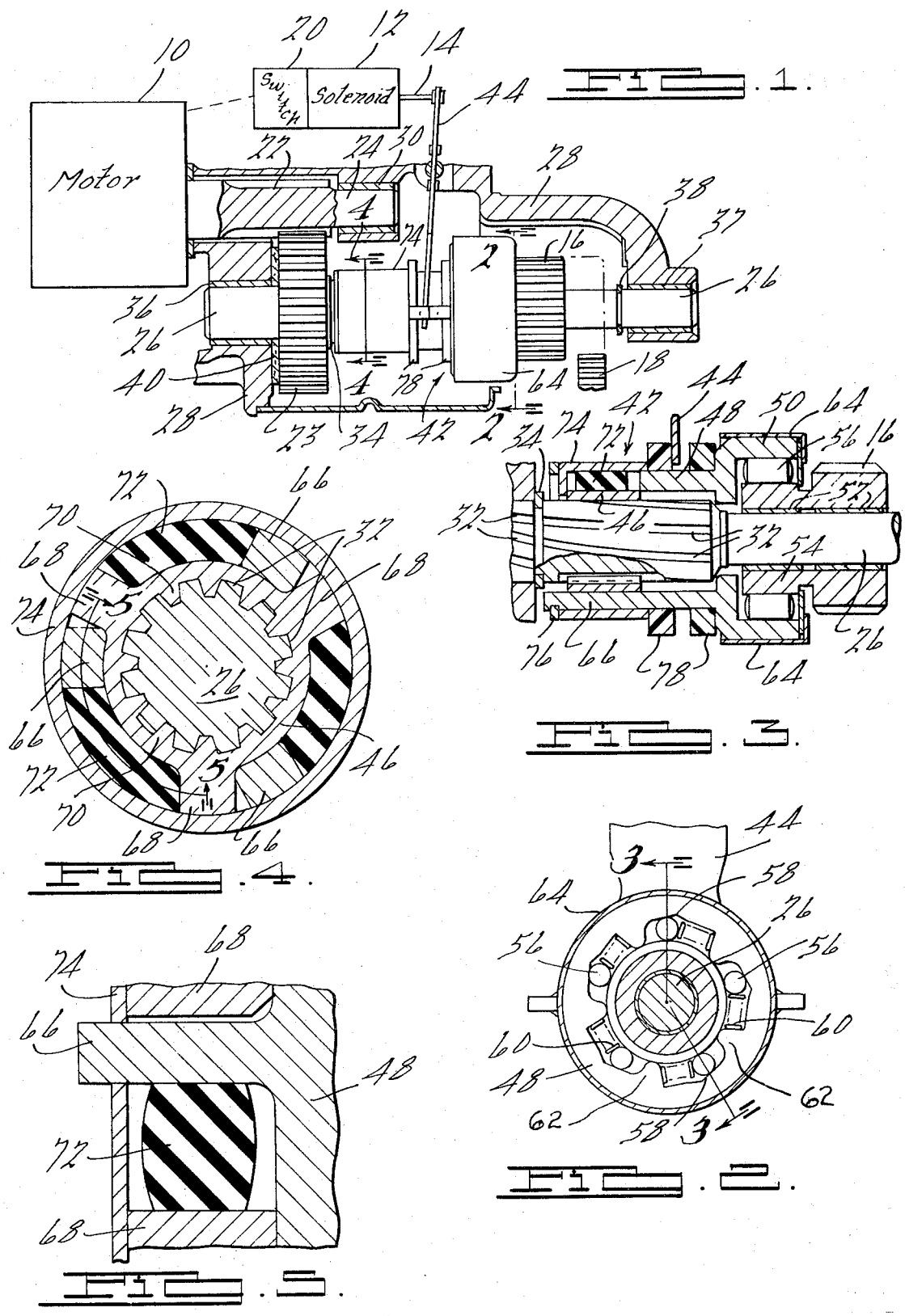

SHOCK ABSORBING STARTER CLUTCH MECHANISM

BACKGROUND OF THE INVENTION

1. Field of Invention

This invention relates to starter drivers and more particularly, to shock absorbing members interposed in the space between driver and driven member in the starter clutch unit.

2. Prior Art

Previous starter units such as that shown in the U.S. Pat. No. 3,177,728, have the clutch unit drivenly connected to a drive shaft by spiral splines. In these type units, the clutch unit is an overrunning clutch for preventing the high speed revolutions of the engine from being applied to the starter motor, however, the large amount of torque generated by engine backfiring is transmitted from the ring gear through the pinion attached to the clutch unit and the splines to the starter motor.

Other units use frictional characteristics of elastically deformable units for coupling the torque from the driver to the driven member. In this type of connection, the sureness of the drive is dependent upon the frictional characteristics of the units. As the units are worn, the frictional characteristics are changed and drive is not as desired.

SUMMARY OF THE INVENTION

It is the principal object of the invention to absorb abnormally high reverse shock loads due to engine backfire in a motor vehicle from being transferred from the ring gear to the starter motor.

It is another object to provide in a motor vehicle starter unit a shock absorber that will function under adverse conditions without deterioration.

These and other objects will become apparent from the following drawings, description and claims of the motor vehicle electric motor starting unit. The unit has an electric motor, a solenoid responsive to an operator-activated ignition key, a shift lever connected to the solenoid, a pinion assembly coupled to the shift lever and responsive to the solenoid for meshingly engaging the ring gear of an engine. When the pinion is engaged the solenoid activates a switch energizing the electric motor. The torque output of the electric motor is supplied through a drive sleeve rotatively driven by the motor armature to a coupling member drivenly connected to the pinion for rotating the pinion in a first direction. Interposed in the space between the drive sleeve and the coupling member is a resilient compressible shock absorber through which the torque of the motor is coupled from the drive sleeve to the coupling member. During engine backfire a high impulse load is applied to the pinion causing the pinion to rotate in a direction which is opposite to its first direction. This high impact load is transferred through the pinion assembly to the drive sleeve and then to the motor armature. The resilient compressible shock absorbers between the coupling member and the drive sleeve compressibly absorb this high impact load thereby protecting the motor armature.

DESCRIPTION OF DRAWINGS

In the drawings:

FIG. 1 is an elevation view partly in section of the starter unit;

FIG. 2 is a sectional view taken along line 2—2 of FIG. 1 illustrating the overrunning clutch of the starter unit;

FIG. 3 is a partial sectional view taken along line 3—3 of FIG. 2 including the pinion;

FIG. 4 is a sectional view taken along line 4—4 of FIG. 1 showing the position of the shock absorbers between the drive sleeve and the pinion housing arms;

FIG. 5 is a sectional view taken along line 5—5 of FIG. 4 illustrating the relationship of the shock absorber between an ear of the drive sleeve and an arm of the clutch housing.

DETAILED DESCRIPTION

Referring to the figures by the characters of reference there is illustrated in FIG. 1 a starter unit drive train of a motor vehicle. The starter motor 10 and the starter solenoid 12 are illustrated in block diagramatic form in their functional relationship to the starter drive train. The solenoid 12 has a reciprocable operated plunger 14 which when operated shifts a pinion 16 into mesh with the engine cranking ring gear 18 and then through a switch 20, energizes the starter motor 10. The motor 10 supplies rotational power through a pair of gears 22 and 23 to the pinion 16 for rotating the ring gear 18. An example of such a geared starter unit as illustrated in FIG. 1 is found in the U.S. Pat. No. 3,177,728 issued to G. S. Farison which is assigned to the common assignee and is incorporated herein by reference.

In the starter unit illustrated in FIG. 1 the drive pinion 16 is axially off-set from the armature shaft 24 and is rotatably carried by a pinion shaft 26 that is drivenly connected to the armature shaft 24 by a drive gear 23 meshing with the geared teeth 22 on the one end of the armature shaft. As explained in the above identified patent, this axially off-set connection between the armature drive shaft 24 and the pinion shaft 26 provides extreme flexibility in the location of the drive pinion 16 resulting in the lowering of the height of the drive shaft tunnel or hump that projects in the driver's compartment of the vehicle.

The right end of the armature shaft 24 as viewed in FIG. 1 is journalled in the casing 28 by a self-lubricating bearing 30. Intermediate the bearing 30 and the end bell of the motor 10, the armature shaft 24 has a plurality of axially extending gear teeth 22 positioned therearound. The drive gear 23 meshing with the gear teeth 22 on the armature shaft is connected by the splines 32 to the pinion shaft 26 and is locked against axial movement to the right by a first snap ring 34. The pinion shaft 26 is journalled in at each end in the casing by a self-lubricating bearing 36 and 37 and is prevented from axially moving to the right by a second snap ring 38 secured about the shaft 26.

Interposed in the space between the drive gear 23 and the casing 28 is a friction braking washer 40. The washer 40 functions to prevent over-run of the gearing and the armature shaft 24 when the engine is started and the pinion 16 has been withdrawn from the ring gear 18 as will hereinafter be explained. The starter unit clutch assembly 42 including the pinion gear 16, is mounted to the shaft to the right of the first snap ring 34.

Operatively coupled to the solenoid 12 and to the clutch assembly 42 is a resilient shift lever 44 for shifting the pinion gear 16 into engagement with the ring gear 18 when the solenoid is energized and prior to the energization of the motor 10. The resilient feature of the shift lever 44 as explained in the above identified patent affects a smoother and more positive shift of the clutch along the pinion shaft 26 with a physically smaller solenoid.

A drive sleeve 46 as illustrated in FIG. 3 and FIG. 4 is drivenly connected to the pinion shaft 26 by right hand spiral splines 32. These splines rotate the sleeve 46 about the shaft as the pinion 16 is being shifted toward the right by the shift lever 44. The rotation of the drive sleeve 46 also rotates the clutch housing 48 and the pinion 16 as will hereinafter be explained. The rotation of the pinion as it is being shifted facilitates meshing of the pinion 16 and the ring gear 18.

Illustrated in FIGS. 2 and 3, the enlarged cup end 50 of the housing contains the overrunning clutch. This overrunning clutch permits the pinion 16 to overrun the pinion shaft 26 when the engine starts and the ring gear 18 is driven faster than the starter motor 10. The pinion 16 which is functionally divided into two sections is journalled on the drive shaft by a bearing 52 supporting each section. One section of the pinion is an extending hub 54 that is ground to form the inner race for a plurality of rollers 56 of the overrunning clutch and the other section is the gearing section.

The cup end 50 of the housing 48 forms the outer race for the clutch and its interior surface is grooved to provide a plurality of roller ramps 58 for the clutch rollers 56. A plurality of springs 60 are each positioned in the housing adjacent to each roller 56 by means of an equal number of protruberances 62 equally spaced around the interior of the housing. The springs 60 exert a force against the rollers 56 thereby pressing the rollers toward the driving engaging ends of the ramp surfaces. A cover means 64 encloses the outer surface of the cup for retaining the springs 60 and rollers 56.

The left end of the clutch housing in the preferred embodiment has three equal and equally spaced arms 66 extending in the axial direction. As illustrated in the sectional view of FIG. 4, these arms extend over the internal helical splined drive sleeve 46. The drive sleeve 46, likewise, has three ears 68 equally spaced about the periphery of the sleeve extending the axial length of the sleeve. The splines 70 of the inner surface of the drive sleeve are helical right-hand splines for meshing with the splines 32 on the pinion drive shaft 26. Interposed in the space between each ear 68 of the drive sleeve and each arm 66 of the housing is a shock absorbing member 72 of the present invention.

The shock absorbers 72 are interposed in the space between an ear 68 of the drive sleeve 46 and a corresponding arm 66 of the housing 48 and are retained therein by means of a cover 74. The cover 74 is retained by means of a retainer clip 76 positioned in an arcuate groove in each arm 66 of the housing. Each shock absorber 72 in the preferred embodiment is fabricated from millable urethane which was selected for its ability to withstand the extreme environmental characteristics found within the gear starter unit. FIG. 5 illustrates the resilient deformability and compressisiblity of the shock absorber 72 in the normal load direction as torque is transferred from the ear 68 of the drive sleeve 46 to the arm 66 of the housing 48.

When the solenoid 12 is energized, the pinion 16 is moved along the drive shaft 26 by means of the shift lever 44 acting through the actuators 78 on the housing and is rotated by the splines 32 and 70 to mesh with the ring gear 18. The pinion 16 engages the engine ring gear 18 as the solenoid plunger 14 completes its travel within the solenoid 12. When the pinion 16 engages the ring gear, the plunger 14 of the solenoid closes the switch 20 for supplying electrical power to the starter motor 10. As the motor es energized, the armature shaft 24 rotates in a counter-clockwise direction as viewed from the right end of FIG. 1. This rotational motion is transmitted to the pinion 16 through the drive gear 23, the pinion shaft 26, the drive sleeve 46 and the overrunning clutch unit 42.

As the drive gear 23 rotates, driving the pinion shaft in a clockwise rotational direction, the drive sleeve 46 through the splines, rotates the pinion 16 in a clockwise direction when viewing from the right in FIG. 1. The torque from the motor 10 is coupled from the ears 68 of the drive sleeve through each of the shock absorber members 72 to the arms 66 of the housing. And as previously indicated through the overrunning clutch, the pinion 16 drives the ring or cranking gear 18. As the rotational speed of the cranking gear is increased due to the ignition of the engine, the overrunning clutch allows the pinion 16 to rotate freely without transmitting high speed rotation thereof back through the pinion shaft to the motor 10. In this normal rotational direction, the typical torque load on the shaft 26 is on the order of ten foot pounds.

When the engine for various reasons backfires, the amount of torque applied by the ring gear 18 to the pinion 16 and hence to the pinion shaft 26 is on the order of approximately 100 foot pounds or 5 to 10 times greater than the normal starting load. In addition, this applied torque is in a direction opposite to the normal direction of rotation of the pinion shaft 26. Since a typical backfire is a short burst or pulse of energy, the ring gear 18 is driven for a pulsed or short time rotation in the reverse direction. When this torque is being transferred from the arms 66 of the housing to the ears 68 of the drive sleeve, the shock absorbing members 72 resiliently and compressibly deform to absorb this high impact load.

Referring to the illustration in FIG. 5, which illustrates the normal compressibility of the shock absorbers 72 under starting conditions. The shock absorber 72 in response to this high reverse impact or pulsed load resiliently deforms and compresses to completely fill the space between the ear 68 of the drive sleeve and the arm 66 of the housing. This resilient deformation and compressibility effectively reduces and in a great extent eliminates the transfer of the backfiring torque to the starter motor from the engine.

In the preferred embodiment the shock absorbing members 72 as stated are millable urethane members. However, it has been found that other materials such as neoprene and even some alloys of steel may be used to absorb the high impact loads generated during backfiring of the internal combustion engine.

As illustrated in the U.S. Pat. No. 3,177,728 and in FIG. 1, the armature shaft 24 and pinion shaft 26 are shown as being in an offset relationship and, in particular, as being parallelly displaced relative to each other. The operating connection between the two shafts 24 and 26 is the geared connection comprising the gear teeth 22 and the drive gear 23. It is apparent to those skilled in the art, that the armature shaft 24 and the pinion shaft 26 could, in fact, be the same shaft of sufficient length. In this type of construction the drive pinion 16 will be mounted on armature shaft for rotation and will be meshingly engaged with the ring gear 18 which is drivenly connected to a load such as an engine.

There has thus been shown and described, a shock absorbing starter clutch mechanism for use in motor vehicles. The shock absorbing members absorb the high impact load generated during backfiring of a motor vehicle engine and prevent the application of these high loads to the starter motor assembly.

What is claimed is:

1. In a power drive train comprising:
   a motor having an armature shaft coupled to a pinion shaft extending beyond the end bell of the motor housing;
   a pinion mounted on said pinion shaft for rotation therewith;
   a gear meshingly engaged with said pinion and drivingly connected to a load, said gear normally rotating in one direction but responsive to the load for pulsed rotation in the opposite direction;
   a drive sleeve rotatably mounted on said pinion shaft intermediate the pinion and the end bell of said motor housing, said drive sleeve having a plurality of spaced radially extending ears;
   a coupling member supported on said pinion shaft intermediate said pinion and said drive sleeve, said coupling member having a plurality of spaced arms extending in direction parallel to the axis of said pinion shaft and extending through the plane of rotation of said ears in said drive sleeve; and
   a shock absorbing member interposed in the space between each ear of said drive sleeve and an adjacent arm of said coupling member, said shock absorbing member adapted to transmit the torque developed by said motor to said pinion in said normal rotational direction and compressible for receiving and absorbing the pulsed torque developed by the load through said gear in the opposite rotational direction.

2. In a power drive train according to claim 1 wherein said shock absorbing member is formed from millable urethane.

3. In a power drive train according to claim 1 where said ears on said drive sleeve are equal and equally angularly spaced and the arms on said coupling member are equal, equally angularly spaced and equal in number to the number of ears on said drive sleeve and further said arms are spaced from said ears when said arms extend through the plane of rotation of said ears.

4. In a power drive train according to claim 3 wherein said shock absorbing members are respectively interposed in the space between the ears of said drive sleeve and the adjacent arms of said coupling member forming a resilient connection therebetween.

5. In a motor vehicle having an electric motor starting unit for starting the engine thereof, said motor starting unit comprising:
   an electric motor having a rotatable armature shaft;
   a solenoid having a reciprocable operated plunger;
   means for energizing said motor in response to said reciprocable operated plunger;
   a drive shaft coupled to said armature shaft and driven thereby;
   a pinion rotatably mounted on said shaft and axially movable therealong for meshingly engaging a ring gear drivingly connected to the engine;
   a drive sleeve drivenly connected to said drive shaft, said drive sleeve having a plurality of equally spaced radially extending ears;
   a shifting means connected to said reciprocable operated plunger for axially moving said pinion into meshingly engagement with the ring gear;
   an overrunning clutch for drivingly connecting said drive shaft to said pinion, for rotation in one direction, said clutch having a housing member with a plurality of equally spaced axially extending arms axially extending respectively through the space between the ears of said drive sleeve; and
   a resilient compressible shock absorbing member interposed in the space between an ear and an adjacent arm in the direction of normal rotation, said member normally transmitting the torque generated by said motor from said ear to the arm of said overrunning clutch housing for rotating said gear for staring said engine and said member compressingly absorbing the high impact torque generated by the engine driving said gear in the opposing direction.

6. The electric motor starting unit according to claim 5 wherein said resilient compressible shock absorbing member is millable urethane.

7. The electric motor starting unit according to claim 6 wherein said drive shaft is axially offset from said armature shaft and drivenly connected thereto by gear means.

* * * * *